(12) United States Patent  
Sidey et al.

(10) Patent No.: US 7,042,126 B2
(45) Date of Patent: May 9, 2006

(54) ROTARY ELECTRIC MACHINE

(75) Inventors: Roger Sidey, East Twickenham (GB);
Julian Oliver Reed, Haslemere (GB)

(73) Assignee: Corac Group plc, Uxbridge (GB)

( * ) Notice: Subject to any disclaimer, the term of this patent is extended or adjusted under 35 U.S.C. 154(b) by 0 days.

(21) Appl. No.: 10/841,777

(22) Filed: May 7, 2004

(65) Prior Publication Data

US 2004/0222713 A1 Nov. 11, 2004

(30) Foreign Application Priority Data

May 8, 2003 (GB) ................................. 0310639.0

(51) Int. Cl.
*H02K 21/12* (2006.01)
(52) U.S. Cl. ........................... 310/156.43; 310/156.15; 310/156.28
(58) Field of Classification Search ................................ 310/156.01–156.84
See application file for complete search history.

(56) References Cited

U.S. PATENT DOCUMENTS 4,827,170 A * 5/1989 Kawamura et al. .... 310/156.28
5,168,186 A * 12/1992 Yashiro ........................ 310/47
5,220,228 A * 6/1993 Sibata ......................... 310/254
6,144,130 A * 11/2000 Kawamura ............. 310/156.28
2003/0020351 A1 1/2003 Lee et al.

FOREIGN PATENT DOCUMENTS

EP 0 096 515 12/1983
GB 2 089 584 6/1982
JP 10-94202 4/1998

* cited by examiner

*Primary Examiner*—Thanh Lam
(74) *Attorney, Agent, or Firm*—Alec Messulam; Jon A. Gibbons; Fleit, Kain, Gibbons, Gutman, Bongini & Bianco P.L.

(57) ABSTRACT

A rotary electric machine is disclosed having stator windings and a rotor incorporating permanent magnets distributed about the axis of the rotor to create a magnetic field having circumferentially alternating north and south poles. In the invention, the principal structural member is an external sleeve, this providing resistance to bending and to centrifugally induced stresses due to rotation. The direction of polarization of the permanent magnets 214 is such that the parts of the magnetic circuits that lie within the outer circumference of the rotor pass predominantly through the bodies of the permanent magnets 214, thereby avoiding the need for a central ferromagnetic core to complete the magnetic circuit of the magnets.

23 Claims, 3 Drawing Sheets

ROTARY ELECTRIC MACHINE

CROSS-REFERENCE TO RELATED APPLICATIONS

This application is based upon and claims priority from prior British Patent Application No. 0310639.0, filed on May 8, 2003, the entire disclosure of each reference which is herein incorporated by reference in its entirety.

FIELD OF THE INVENTION

The present invention generally relates to rotary electric machines, that is to say motors and generators. The invention is particularly applicable to high speed motors such as used to drive turbo machinery directly. The invention is more specifically concerned with machines of the permanent magnet brushless type, which have largely superseded the earlier commutator motor technology.

BACKGROUND OF THE INVENTION

Brushless DC motors, as they are called, are driven directly from a polyphase AC supply, which energizes a system of stator windings. The stator assembly, in response to the phase drive currents, produces a rotating magnetic flux, which interacts with the rotor flux. This in turn applies torque to the rotor, attempting to align its flux with the rotating field. Thus the rotor turns in synchronism with the stator flux and at a precise multiple (or more correctly sub-multiple) of the supply frequency. In modern motor drive systems the brushless motor is driven from a mains supply via an electronic power converter unit. This produces both a variable frequency and variable amplitude phase drive for the motor to allow control of motor speed over a range of load torque conditions.

Distributed about the rotor assembly of these machines is a system of permanent magnets that are arranged to provide a radial flux distribution mirroring the flux distribution of the rotor magnetic field. FIG. 1 of the accompanying drawings is a diagrammatic sectional view through a typical rotor construction for a 3-phase 2-pole-pair machine. Here, a system of four radially polarized magnets is disposed about the surface of a shaft to give a symmetrical flux pattern of two pole-pairs (north-south pairs). In this arrangement, the shaft acts both as a support for the rotor and as a low reluctance return circuit for the flux entering or leaving the inner faces of the magnets.

Elimination of the commutator, resulting in the brushless dc motor, has brought about a number of benefits these including freedom from arcing and commutator erosion, and a considerably more compact, simplified and rugged assembly. This in turn has led to the development of very high performance machines where operating speed and overall power density is greatly increased over the earlier mechanically commutated designs. At elevated operating speeds the design of the rotor assembly however becomes increasingly critical. Considerable mechanical stability and accuracy of form of the assembly is required to minimize destructive imbalance forces, and the structure must be designed to withstand the centrifugal or bursting stresses induced by rotation.

At high operating speeds the prior art rotor design of FIG. 1 shows limitations. The alloys or compositions of modern high performance magnets are brittle materials, exhibiting relatively low strength. They are not capable of withstanding significant tensile stress and thus require confinement to protect them from disintegrating. The prior art rotor design of FIG. 1 is generally achieved using a prior art overall constraining sleeve manufactured from a material such as filament wound carbon fiber that is not permeable to the rotor flux and that exhibits high tensile strength. Use of the prior art overall constraining sleeve however brings with it the disadvantages of an increase in the stator-rotor gap across which flux must be driven, and a corresponding reduction of the structural core diameter of the rotor. For the same motor efficiency, a greater volume of magnet is now required which results in a further reduction in rotor core diameter.

For high-speed rotation, the bending stiffness of the shaft is an important consideration. The self-mass or density and the body stiffness of the rotor will determine the frequencies of a series of modes of vibration. If the motor dwells, even for short periods of time, at a speed corresponding to the frequency of one of these modes, considerable energy can be coupled into transverse vibration and this can cause bearing damage or catastrophic failure of the shaft. In the design of these high-speed machines therefore, considerable effort is invested in achieving stiff and lightweight structures, while simultaneously providing constraint for the magnet assembly to eliminate or minimize tensile stresses within the material. Since the shaft stiffness in bending is proportional to the fourth power of the structural core diameter, it can be appreciated that in this prior art design, a careful trade off must be struck in the allocation of materials to the structural core, magnet and prior art constraining sleeve components of the rotor.

Accordingly, what is needed is to overcome the shortcoming and the drawbacks of the prior art, and to provide a rotor construction which allows high shaft stiffness together with the achievement of good magnet constraint conditions. The invention further offers the benefits of an extremely simple construction with no redundant magnet confining material.

SUMMARY OF THE INVENTION

According to the present invention, there is provided a rotary electric machine having stator windings and a rotor incorporating at least one permanent magnet to create a magnetic field having circumferentially alternating north and south poles, characterized in that the rotor incorporates a torque transmitting section formed as a hollow tube of low magnetic permeability material, in that the permanent magnet(s) is(are) arranged within and radially retained by the hollow tube and in that the part of the magnetic circuit that lies within the hollow tube passes predominantly through the body of the permanent magnet(s).

The invention avoids the need for an additional prior art magnet constraining sleeve by placing the magnet(s) within a hollow section of the rotor so that the magnets are radially supported and prevented from flying out or disintegrating at high rotational speeds.

Modern developments have resulted in a range of materials with the hardness typical of ceramics but with greatly enhanced fracture toughness. These materials are thus well suited for use as the structural element and confining sleeve of the rotor since they provide both high bending stiffness and high resistance to the centrifugal bursting stresses induced by high speed rotation. Typical of these materials are zirconia and enhanced silicon nitride ceramics.

The magnet(s) may have a variety of forms, the simplest being a single diametrically magnetized cylindrical magnet arranged within the hollow tube. For cooling, the cylinder may be formed with an axially extending cylindrical bore. If the ratio of the outer diameter of the cylinder to the diameter of the cylindrical bore is large, say 3:1 or more, then the distortion of magnetic field resulting from the presence of the bore will remain within acceptable limits.

It is alternatively possible to provide a plurality of magnets within the hollow tube, each magnet extending tangentially between each adjacent pair of opposite poles of the rotor.

To minimize the stresses created when the rotor is turning at high speed, the density profile of the rotor should be the same in all planes containing the axis of rotation of the rotor and in all planes normal to the axis of the rotor. If several individual magnets are used which do not together define a cylindrical inner surface, then it is possible to insert inside the magnets a central mass-balancing core of a material having the same density as the permanent magnets.

A further possibility is to provide a system of segmented magnets extending between each adjacent pair of opposite poles of the rotor, the segments being part cylindrical and being polarized along a compound angle or along independent compound angles.

In prior art constructions using several permanent magnets, each of the permanent magnets is magnetized entirely radially and as a consequence it is necessary to have a shaft of ferromagnetic material to complete the circuit between the radially inwards facing poles of the magnets. By contrast, in the present invention the magnets are polarized in such a manner that there is no need to provide a ferromagnetic material to complete the magnetic circuit because the magnetic flux is directed within the magnets, substantially along the path of their vectors of polarization. By dispensing with the need for the rotor to include a ferromagnetic central core, the invention permits the shaft to be made out of a non-ferromagnetic material, the shaft to be located at the outer shell of the rotor and the shaft itself to act as the means for radially restraining the magnets.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention will be apparent from the following detailed description taken in conjunction with the accompanying drawings in which:

DESCRIPTION OF THE PREFERRED EMBODIMENTS

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Figure 1:
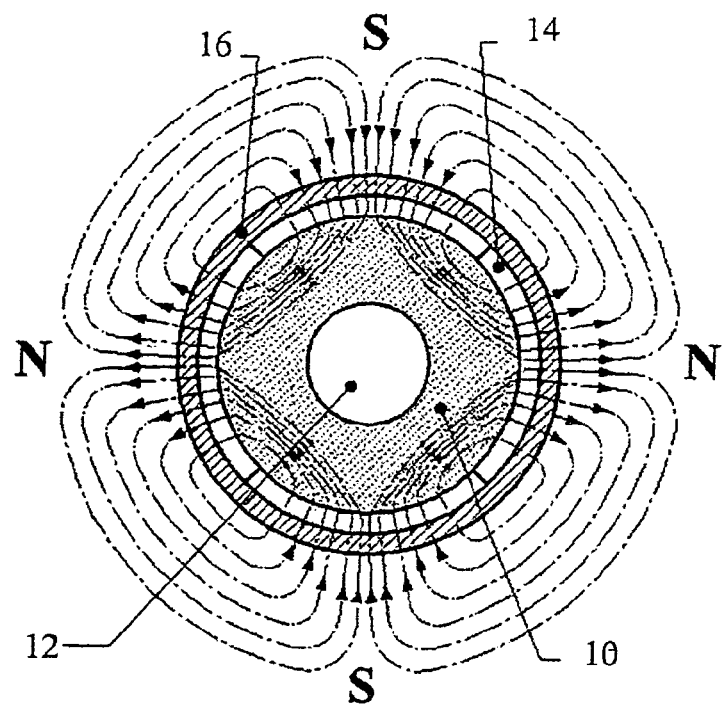
FIG. 1 is a section through a typical rotor as used in the prior art.

The prior art rotor of FIG. 1 has a ferromagnetic support shaft 10 having a central bore 12 for a cooling fluid. Radially polarized magnets 14 are located about the circumference of the shaft 10 and are prevented from flying off by the prior art constraining sleeve 16 of a material with low magnetic permeability, for example of carbon fiber, which is wound around the magnets 14.

As shown in FIG. 1, the magnetic field created by the magnets comprises two north and two south poles distributed regularly about the circumference of the rotor. If the machine is a motor, the magnetic field of the rotor interacts with the magnetic field created by the current in the motor windings to apply a driving torque to the rotor. If the machine is a generator, then the rotation of the magnetic field will induce a voltage in the stationary windings.

It will be noted that the south and north poles are aligned with the centers of the permanent magnets and to complete the magnetic circuit the field lines from each pole to the adjacent opposite pole must pass through the support shaft, making it essential for the shaft to be formed of a ferromagnetic material.

Figure 2:
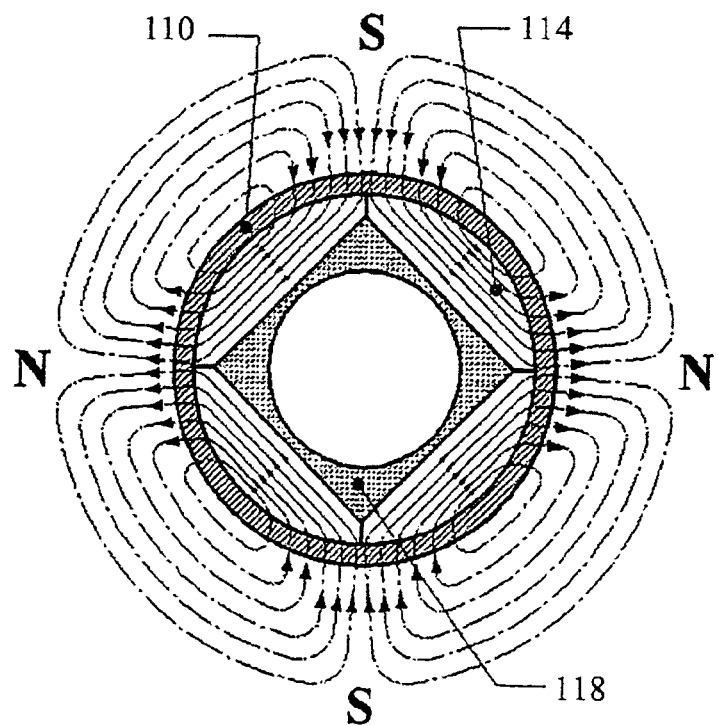
FIGS. 2 to 5 are similar sections through different rotors embodying the present invention.

FIG. 2 shows an embodiment of the present invention in which the torque bearing shaft is a tube 110 of material having low magnetic permeability. The tube is constructed from a stiff structural material such as zirconia, silicon nitride or other engineering ceramic. The tube 110, which is a shaft and a confining sleeve, is efficiently utilized in providing both a maximally stiff and lightweight shaft and a combined confining and locating structure for the magnets 114 disposed within it.

The system of magnets in FIG. 2 comprises four tangentially polarized magnets 114 with like poles meeting or adjoining to form the rotor poles. The action of the external magnetic circuit of the motor stator and the opposing fluxes at the poles forces the flux radially outward at these conjunctions. Thus, without the need for an inner magnetically permeable return path, the configuration provides a similar overall external flux distribution to the conventional radially polarized magnet rotor assembly depicted in FIG. 1.

To minimized gradients in the radial stress induced in the confining sleeve, or tube 110, due to rotation, the magnets 114 in the arrangement of FIG. 2 are shown seated on or disposed about a central mass-balancing core 118. This component, manufactured from a material of similar density to the permanent magnets, functions both to provide registration or seating for the magnets and to restore axisymmetric cylindrical geometry to the mass distribution of the assembly, that is, the density profile is the same in all planes containing the axis of rotation.

Figure 3:
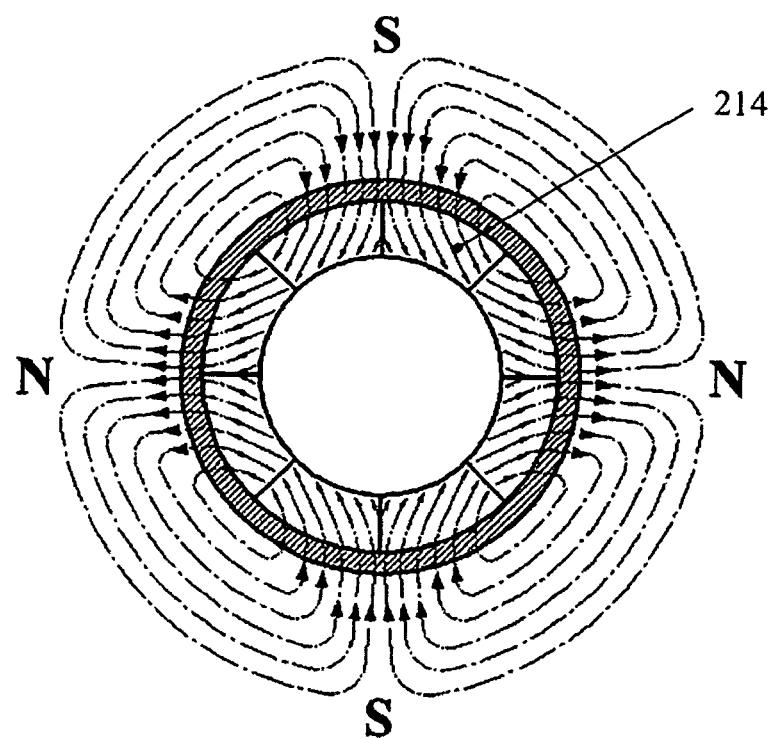

FIG. 3 depicts another embodiment of the invention in which the system of magnets 214 is configured within an outer structural shell in the form of a segmented hollow cylinder. The direction of the polarization of the individual segments is as represented by the flux lines in FIG. 3. In other words, the individual segments have a compound angle of polarization with both a radial and a tangential component. This arrangement has two principal advantages over the configuration of FIG. 2, these relating to improvements in the structural integrity of the assembfy and to the distribution of magnetic flux in the field external to the rotor. By configuring the magnet elements as a set of symmetrical wedges or radially sliced cylindrical segments, the tensile confining stress in the outer confining sleeve, or tube 110, due to rotation is now substantially uniform and as a consequence, so also is the distribution of compressive stress in the magnets 214. Furthermore the magnet segments depicted in FIG. 3 are more mechanically rugged than those depicted in FIG. 2 due to the absence of the shallow tapered flanks in the sectional profile. No additional mass-balancing core is required in the arrangement depicted in FIG. 3, which further simplifies the assembly. This simplicity of section and uniformity in the distribution of mechanical stress means that the rotor can operate at speeds close to the theoretical limits, these being the ultimate tensile and compressive strengths respectively of the outer structural shell and the permanent magnet material.

In respect of the magnetic flux profile, the segmented arrangement of FIG. 3 allows the benefit of a degree of profiling of the magnetization vectors about the axis of the shaft. In the simple arrangement of FIG. 2 where a single tangentially magnetized element 114 links each pole, it can be seen that the opposing flux vectors tend to concentrate or intensify the flux at the poles. This could be detrimental to motor performance particularly in high-speed applications where it could give rise to vibration due to torque pulsation and to power loss due to magnetic hysteresis in the motor stator. The arrangement of FIG. 3 however significantly reduces the flux concentration effect by inclining and hence profiling the angle of the flux vector in a number or discrete circumferential magnet segments 214. In the segmented arrangement of FIG. 3, the magnetic vector of polarization in the segments 214 is neither axial as in the prior art design of FIG. 1 nor wholly tangential as in FIG. 2. At the poles, the vectors of polarization are mirrored and thus flux is forced in or out of the rotor. In the segmented arrangement of FIG. 3, the polarization vector is inclined outwards to assist the forcing of the flux in or out of the rotor, and thus to lessen the degree of concentration of flux about the poles. At either side of the partition between the poles however, the angle of inclination is mirrored but the direction of polarization does not reverse. With polarization vectors being substantially aligned at the junction between the magnetic elements, the flux is mostly confined within the magnets. However, due to the outwardly radial component, the polarization vector approaches the pole at a less oblique angle, and this acts to lessen the degree of peaking or smooth out the concentration of flux at the poles.

Though it will be appreciated that a curved or figured polarization profile such as that of FIG. 3 could be achieved in a single magnet element, i.e. without partitioning or segmenting, it is unlikely that it could be achieved using modern high performance magnetic materials. In the magnetic circuit described here, highly coercive or so-called 'straight line' magnetic materials with high flux density and high intrinsic resistance to demagnetization under elevated operating temperatures are required. In the current state of the art, the choice is restricted to the rare earth Neodymium-Boron-Iron or Samarium-Cobalt material types. These materials exhibit a strong characteristic direction of polarization, which is induced in the material during the manufacturing process. While this process can, to some extent, be modified to yield a progressive magnetization profile deviating from a plain vector, it is often more efficient and economic to configure a component part from machined segments of conventional or linearly polarized material.

Figure 4:
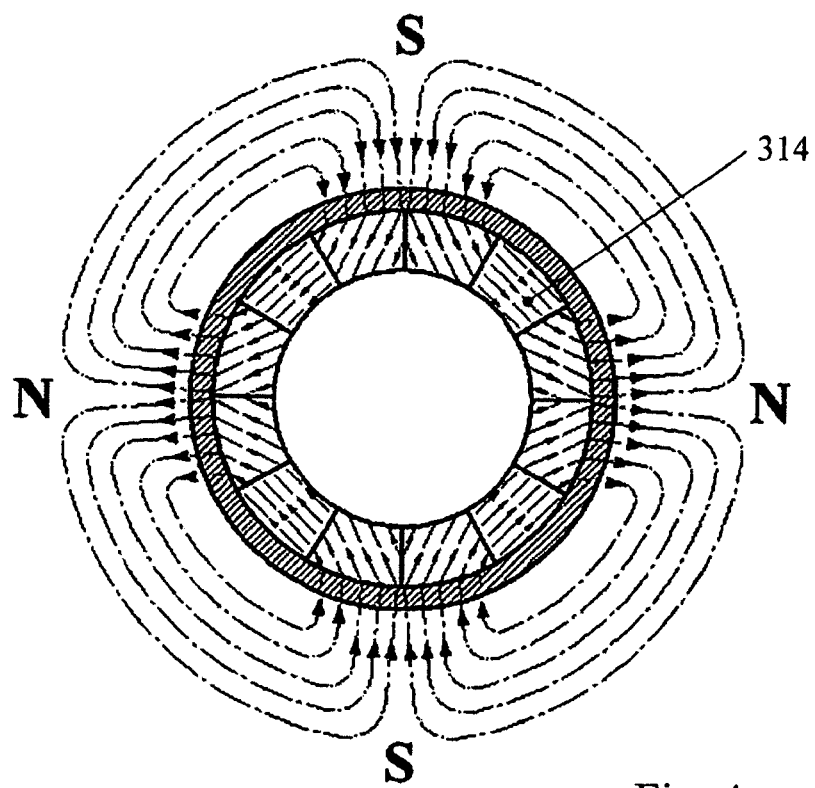

A further beneficial partitioning of the cylindrical magnet volume is shown in FIG. 4. Again illustrated for the example of a four-pole or two pole-pair rotor, the cylindrical magnet volume is now shown divided into twelve segments 314. The distribution or contouring of the polarization vectors between poles now takes place over repeated groups of three magnet segments. As a result, a less abrupt change in the direction of the polarization vector occurs between segments. It can be seen that for a relatively small increase in the total number of magnet segments, a further and significant improvement in the overall flux contour is achieved. The beneficial consequence of this is both in the improvement of the electromagnetic performance of the rotor due to the further reduction in peaking of flux at the poles, and a reduction of the required magnet volume to achieve a given net useful pole flux. The reduction in magnet volume can be used to advantage in either reducing the thickness of the rotor shell or in realizing a higher frequency of flexural resonance of the shaft assembly.

It will be appreciated that the process of segmentation or decimation of the cylindrical magnet volume can be increased to achieve even further moulding or contouring of the polarization vectors than depicted in FIGS. 3 and 4. While increasing the cost of components and manufacture, this would result allow both for optimization of the electromagnetic properties of the rotor and for a minimization of the required magnet mass for a given rotor flux requirement.

It will be further appreciated that the general rotor construction and the process of segmentation or decimation of the cylindrical magnet volume, while discussed above for a two pole pair or four-pole machine, are applicable to a rotor configured for any number of pole pairs.

The principal benefits of the invention arise in the realization of enhanced magnetic performance and structural properties, and in the ease and economy of manufacture.

Figure 5:
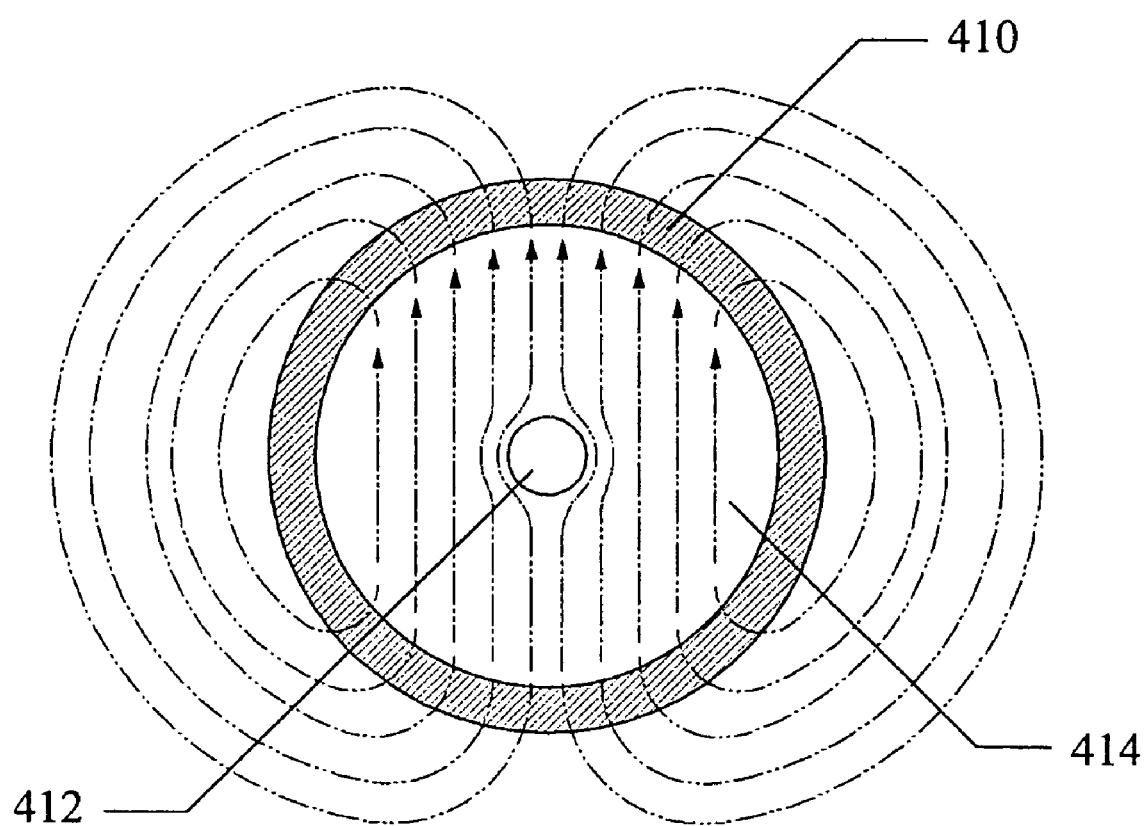

In the embodiment of FIG. 5, the rotor has a single north and a single south pole. Such a flux distribution is suited to the operation of a 2-pole motor where the stator flux vector, which reacts with the rotor flux vector to generate torque and thus to cause it to rotate synchronously with it, rotates a full turn, 360 degrees, for one electrical cycle of stator winding current. The 2-pole configuration of machine is thus employed where maximum rotation speed is required and as such is the machine in which the principal benefits of the present invention, these being enhanced rotor bending stiffness and geometric stability, are most desired in order to minimize potentially damaging vibration forces at high rotational speeds.

A two-pole rotor can most simply be produced by placing within the hollow rotor shaft 410 a single diametrically magnetized cylindrical magnet 414. A cylindrical bore 412 is formed in the magnet 414 for cooling and to reduce the mass of the rotor assembly. Provided that the diameter of the cylindrical bore 412 is small, say no more than one third of the outer diameter of the magnet 414, the distortion of the magnetic field is minimal.

A significant benefit of the embodiment of FIG. 5 is the maximization of the magnet length in the direction of polarization. This gives the benefit of the ability to drive magnetic flux, at substantial levels of flux density, across gaps of relatively large dimension in the principal direction of the flux. As seen from FIG. 5, the maximum polarized length of magnet occurs at the centre of the pole and reduces to zero at the lateral extremes. This gives rise to a smooth and continuous external flux distribution which gives the significant benefit of minimizing electrical eddy current losses due to induced electromagnetic fields within the magnet and within the external stator magnetic circuit, and of reducing also the magnetic loss component due to hysteresis in the soft magnetic material of the stator. This latter loss component increases as a power function of the stator flux density and, as with the eddy current loss, gives rise to undesirable heating of the rotor and stator assemblies of the motor.

Both the utilization of polarized magnet and the attainable volume of working or useful magnet are thus high in this embodiment. For a given density of magnetic flux this allows for the driving of a larger air gap, which, in turn, allows for an increased radial thickness of the outer confining sleeve, or hollow rotor shaft 410, with a corresponding increase in the shaft 410 of bending stiffness and resistance to rotationally induced stress.

A further and important benefit of the embodiment of FIG. 5 is the axisymmetry of the rotor shell and magnet assembly and its inherent simplicity of form. These features make for a high degree of mechanical ruggedness, which for rotationally induced stresses, ensures a maximum uniformity of stress distribution, and thus the ability to approach more closely the ultimate or theoretical limiting speeds.

In all the embodiments of the invention, as the confining sleeve and rotor structure are merged and configured as an overall external sleeve, there is no longer the significant loss of structural stiffness suffered in the conventional design due to the magnet confinement. The outer shell is used to maximum effect both in constraining the magnets by loading them against centrifugal forces in pure compression only, while simultaneously achieving optimum bending stiffness of the overall shaft assembly. Furthermore by eliminating the soft magnetic return circuit in the design, a significant amount of otherwise unwanted mass is removed. This optimal use of material makes possible, for a given cylindrical volume, rotors that can achieve both higher gap flux and higher modal resonant frequencies than is feasible with the conventional designs.

Due to its inherent simplicity, manufacture of a rotor of any embodiment of the invention is more straightforward than is the case with the prior art radial magnet design depicted in FIG. 1. The most significant example of the straightforwardness of manufacture is the elimination of the pressed on or over-wound prior art constraining sleeve of the conventional designs, which necessitates an additional component cost and a stage of manufacture and assembly.

Although a specific embodiment of the present invention has been disclosed, it will be understood by those having skill in the art that changes can be made to this specific embodiment without departing from the spirit and scope of the present invention. The scope of the present invention is not to be restricted, therefore, to the specific embodiment, and it is intended that the appended claims cover any and all such applications, modifications, and embodiments within the scope of the present invention.

What is claimed is:

1. A rotary electric machine comprising:
a plurality of stator windings; and
a rotor incorporating one or more permanent magnets to create a magnetic field having circumferentially alternating north and south poles and incorporating a torque transmitting section formed as a hollow tube of low magnetic permeability material, wherein the permanent magnets are arranged radially within and are radially retained by the hollow tube, wherein a part of a magnetic circuit that lies within the hollow tube passes predominantly through the permanent magnets, and wherein the torque transmitting section performs the function of at least a portion of a shaft of the rotary electric machine.

2. The rotary electric machine as claimed in claim 1, wherein the torque transmitting section of the rotor is formed of a ceramic material.

3. The rotary electric machine as claimed in claim 2, wherein the ceramic material comprises a high fracture toughness material of the zirconia or silicon nitride types.

4. The rotary electric machine as claimed in claim 1, wherein the one or more permanent magnets comprise a plurality of magnets provided within the hollow tube, each magnet extending tangentially between each adjacent pair of opposite poles of the rotor.

5. The rotary electric machine as claimed in claim 4, wherein a central mass-balancing core of a material having the same density as the permanent magnets is arranged radially inwardly of the magnets.

6. The rotary electric machine as claimed in claim 1, wherein a system of segmented magnets extends between each adjacent pair of opposite poles of the rotor, the segmented magnets being partly cylindrical and being polarized along an angle with a tangential component.

7. The rotary electric machine as claimed in claim 1, wherein the density profile of the rotor is substantially the same in all planes containing the axis of rotation of the rotor and in all planes normal to the axis of the rotor.

8. The rotary electric machine as claimed in claim 1, wherein the permanent magnets are formed of Neodymium-Boron-Iron or Samarium-Cobalt.

9. The rotary electric machine as claimed in claim 1, wherein the one or more permanent magnets constitute a single magnet arranged within the hollow tube, the single magnet having a shape of a diametrically magnetized cylinder.

10. The rotary electric machine as claimed in claim 9, wherein the single magnet has a shape of a diametrically magnetized cylinder with an axially extending cylindrical bore.

11. The rotary electric machine of claim 1, in which the rotary electric machine of claim 1 lacks a shaft at a core of the rotor, and the torque transmitting section performs the function of the portion of the shaft at the core of the rotor.

12. A rotary electric machine comprising:
a plurality of stator windings; and
a rotor incorporating one or more permanent magnets to create a magnetic field having circumferentially alternating north and south poles, the rotor including,
a hollow tube of low magnetic permeability material surrounding the rotor, wherein the permanent magnets are arranged radially within and are radially retained by the hollow tube, wherein a part of a magnetic circuit within the hollow tube passes predominantly through the permanent magnets, and wherein the hollow tube performs the function of at least a portion of a shaft of the rotary electric machine.

13. The rotary electric machine as claimed in claim 12, wherein the rotor includes a core formed at least in part with non-ferromagnetic material.

14. The rotary electric machine of claim 13, in which the rotary electric machine of claim 11 lacks a shaft at the core of the rotor, and the hollow tube performs the function of the portion of the shaft at the core of the rotor.

15. The rotary electric machine as claimed in claim 12, wherein at least the hollow tube of the rotor is formed of a ceramic material.

16. The rotary electric machine as claimed in claim 15, wherein the ceramic material comprises a high fracture toughness material of the zirconia or silicon nitride types.

17. The rotary electric machine as claimed in claim 12, wherein the one or more permanent magnets constitute a system of segmented magnets, the system of segmented magnets extending tangentially between each adjacent pair of opposite poles of the rotor.

18. The rotary electric machine as claimed in claim 17, wherein a central mass-balancing core of a material having the same density as the permanent magnets is arranged radially inward of the magnets.

19. The rotary electric machine as claimed in claim 12, wherein a system of segmented magnets extends between each adjacent pair of opposite poles of the rotor, the segmented magnets being partly cylindrical and being polarized along an angle with a tangential component.

20. The rotary electric machine as claimed in claim 12, wherein the density profile of the rotor is substantially the same in all planes containing the axis of rotation of the rotor and in all planes normal to the axis of the rotor.

21. The rotary electric machine as claimed in claim 12, wherein the permanent magnet are formed of Neodymium-Boron-Iron or Samarium-Cobalt.

22. The rotary electric machine as claimed in claim 12, wherein the one or more permanent magnets constitute a single magnet arranged within the hollow tube, the single magnet having a shape of a diametrically magnetized cylinder.

23. The rotary electric machine as claimed in claim 22, wherein the single magnet has a shape of a diametrically magnetized cylinder with an axially extending cylindrical bore.

* * * * *